United States Patent [19]

Cheng et al.

[11] Patent Number: 4,654,064
[45] Date of Patent: Mar. 31, 1987

[54] PRIMARY REFRIGERANT EUTECTIC FREEZING PROCESS [PREUF PROCESS]

[76] Inventors: Chen-Yen Cheng; Wu-Ching Cheng; Wu-Cheh Cheng, all of 9605 La Playa St., NE., Albuquerque, N. Mex. 87111

[21] Appl. No.: 824,613

[22] Filed: Jan. 31, 1986

[51] Int. Cl.[4] ............................................. B01D 9/04
[52] U.S. Cl. ......................................... 62/532; 62/12
[58] Field of Search ............................ 62/12, 123, 532

[56] References Cited

U.S. PATENT DOCUMENTS

| | | | |
|---|---|---|---|
| 3,395,546 | 8/1968 | Sherlock et al. | 62/12 |
| 4,218,893 | 8/1980 | Cheng et al. | 62/532 |
| 4,236,382 | 12/1980 | Cheng et al. | 62/532 |

Primary Examiner—Ronald C. Capossela

[57] ABSTRACT

A process of separating a multi-component liquid mixture containing n major components by forming crystals of m components, denoted as m crystallizing components, in a crystallization zone, denoted as a first processing zone, having k crystallization sub-zones, the value of m being equal to or greater than 2 and equal to or less than n, the value of k being equal to or greater than 1 and equal to or less than m, comprising a first step of crystallizing the m components in the k crystallization sub-zones to form a first condensed mass and a second step of vaporizing a mass of the volatile component(s) from the liquid mixture to form a first vapor in each sub-zone under a first pressure that is lower than the eutectic pressure defined as the equilibrium pressure at which the m solid phases and the liquid mixture coexist with a vapor phase containing the volatile component(s), wherein the said first step and the second step are conducted simultaneously so that at least a major fraction of the heat released in Step 1 operation is removed by the Step 2 operation in each sub-zone.

9 Claims, 29 Drawing Figures

MODE 1: CO-CRYSTALLIZATION

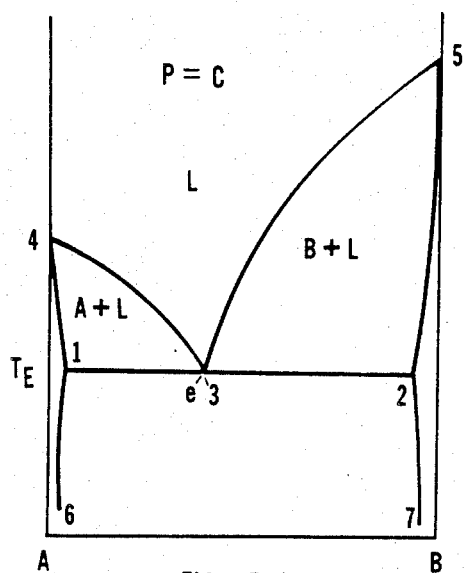
FIGURE 1
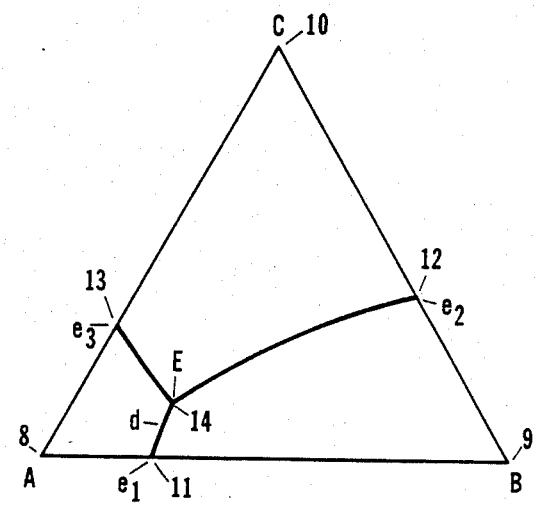
FIGURE 2
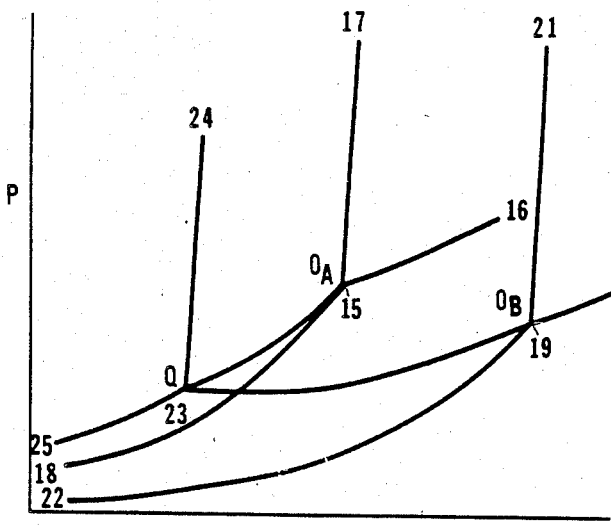
FIGURE 3-a
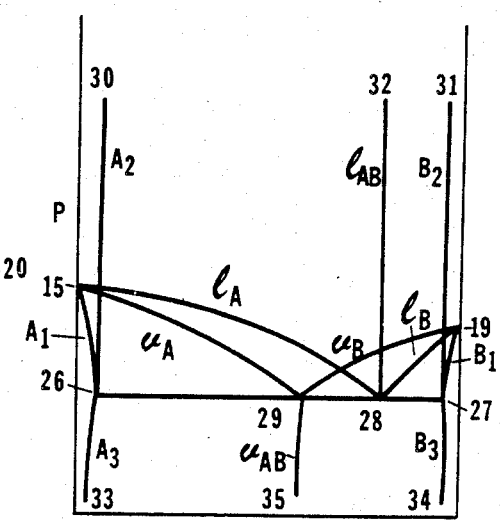
FIGURE 3-b
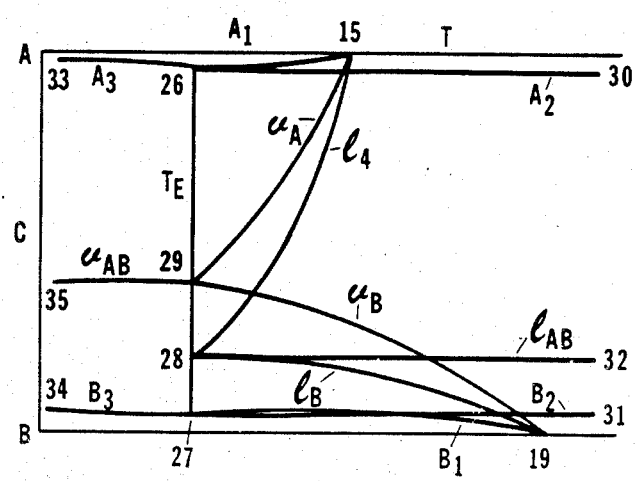
FIGURE 3-c MODE 1: CO-CRYSTALLIZATION
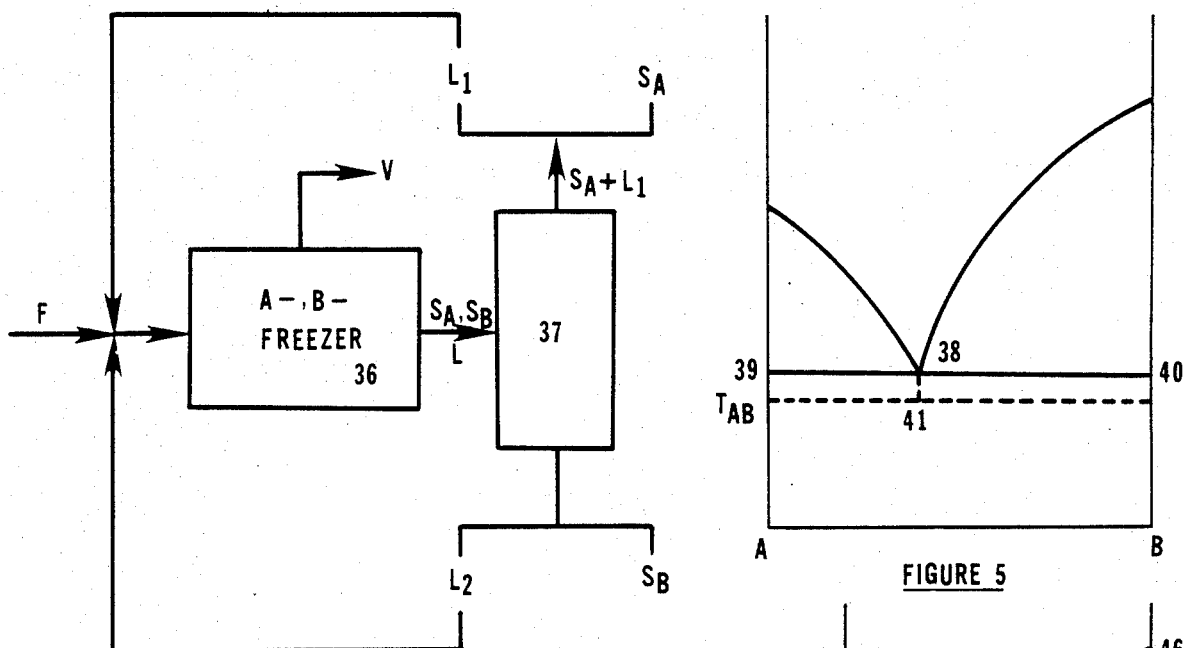
FIGURE 4
MODE 2: PARALLEL CRYSTALLIZATION
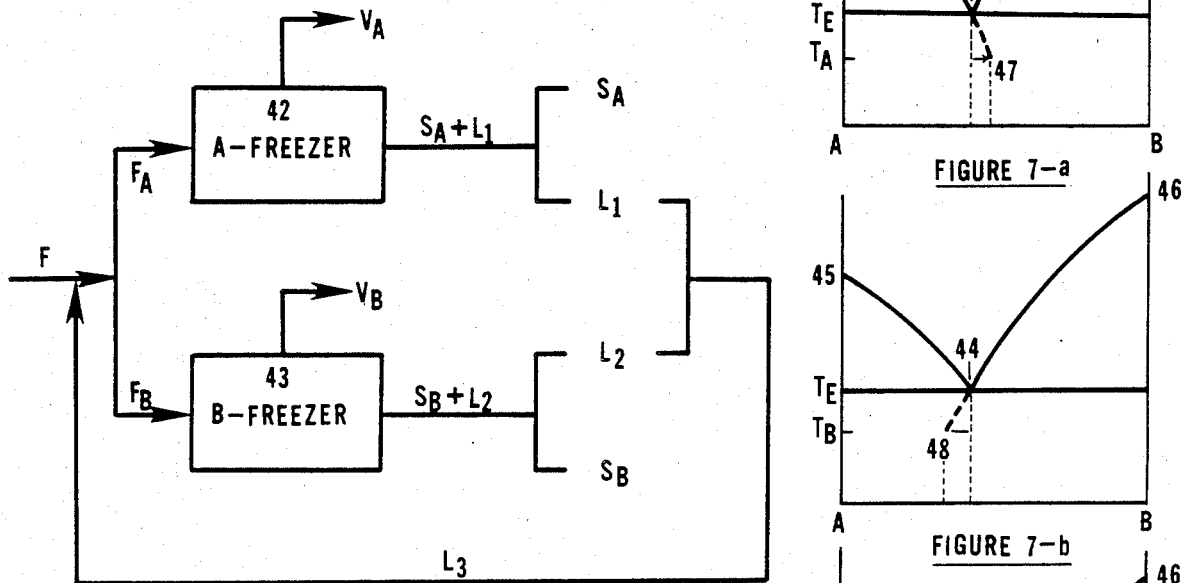
FIGURE 6
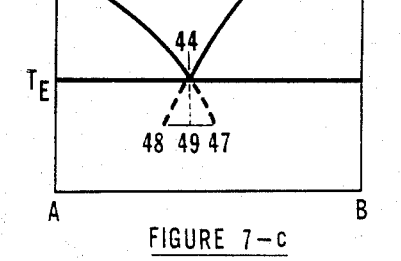

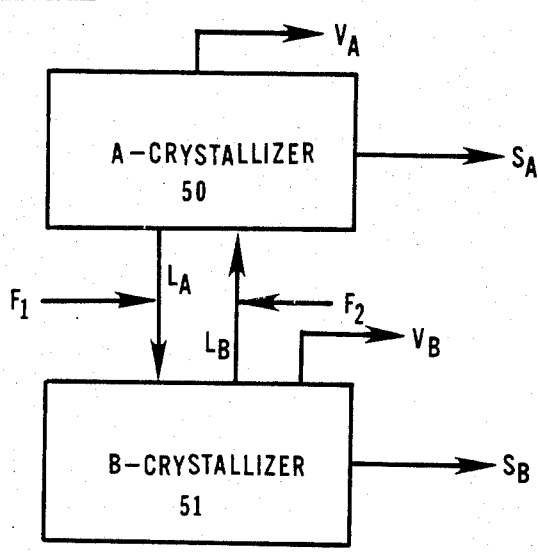
FIGURE 8 — MODE 3: SUCCESSIVE CRYSTALLIZATION
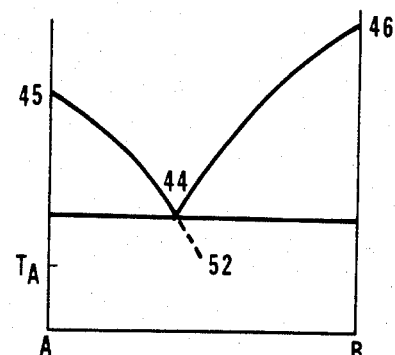
FIGURE 9-a
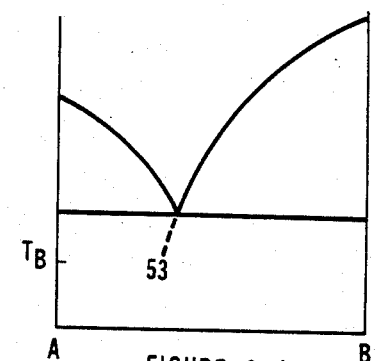
FIGURE 9-b
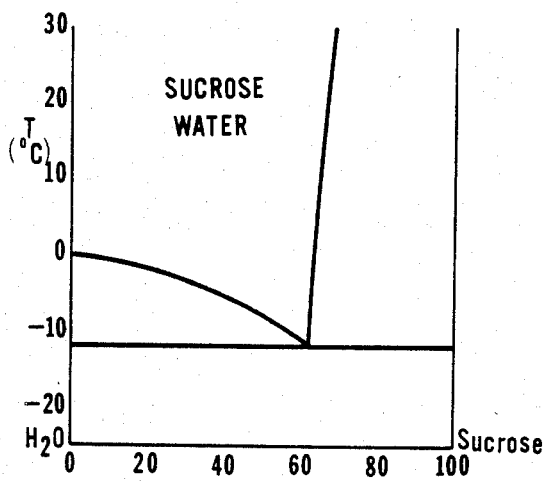
FIGURE 10
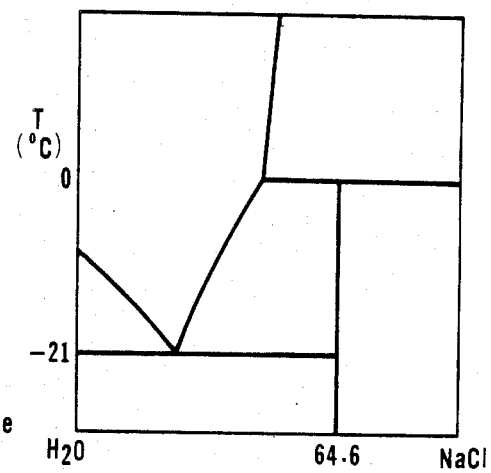
FIGURE 11
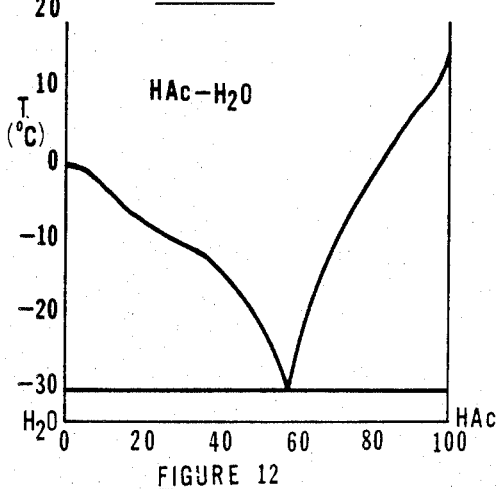
FIGURE 12
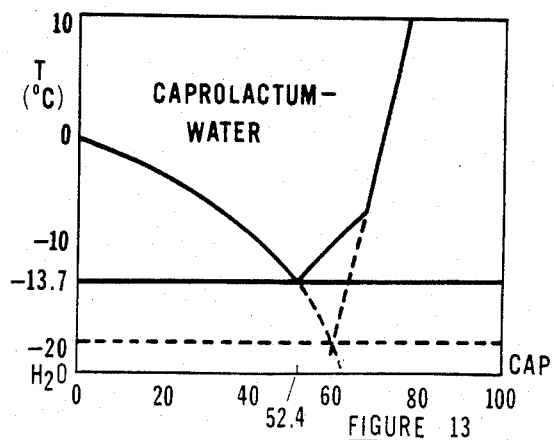
FIGURE 13

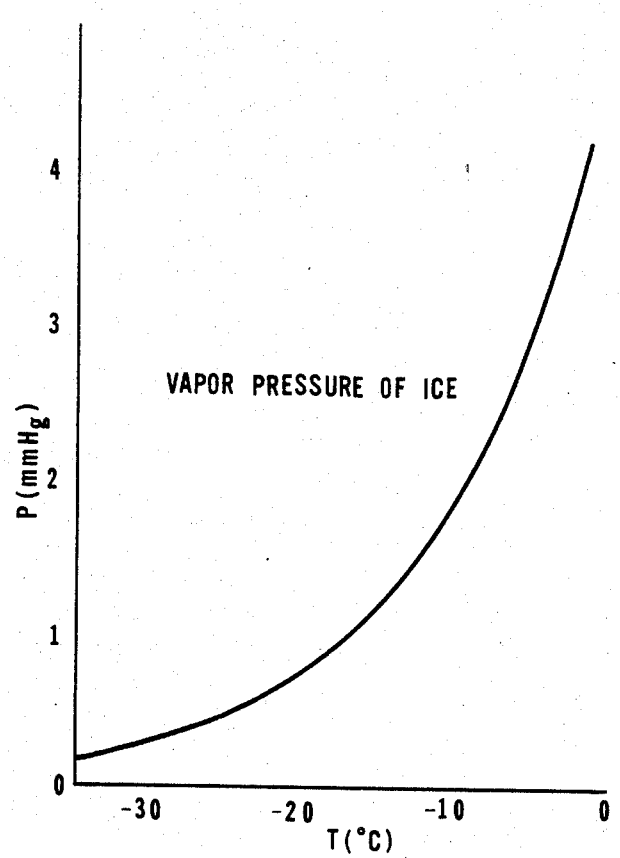
FIGURE 14-a
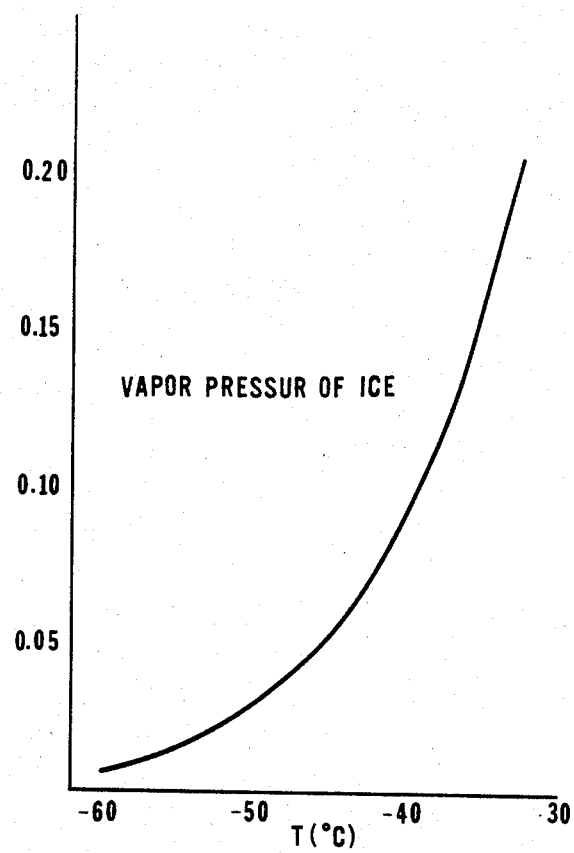
FIGURE 14-b
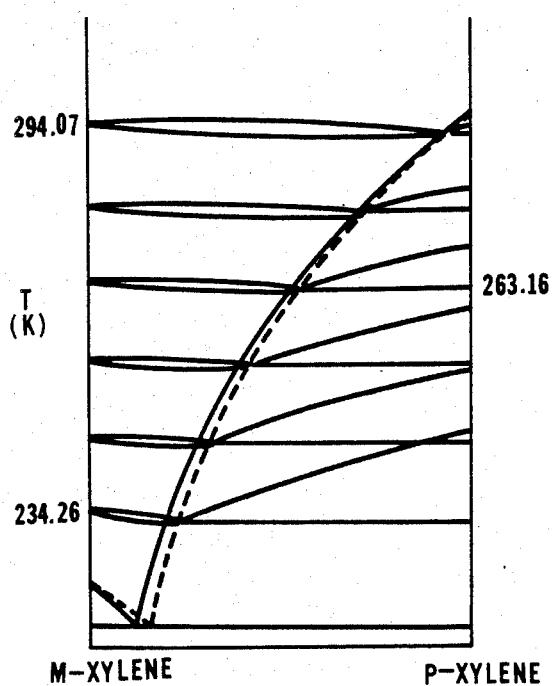
FIGURE 15
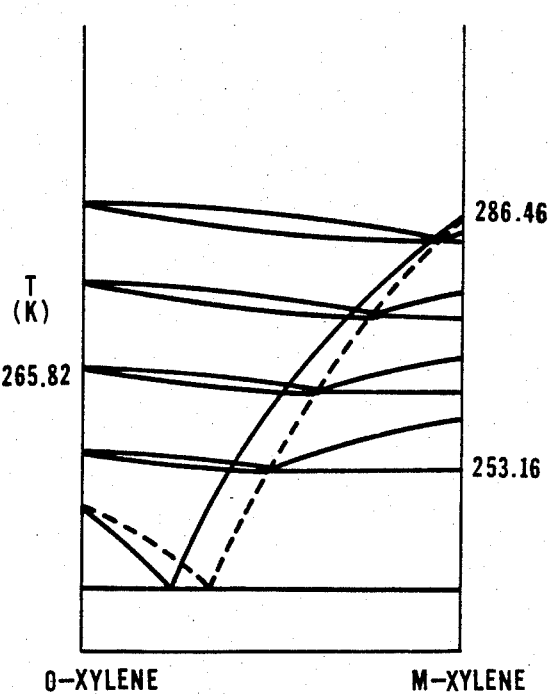
FIGURE 16

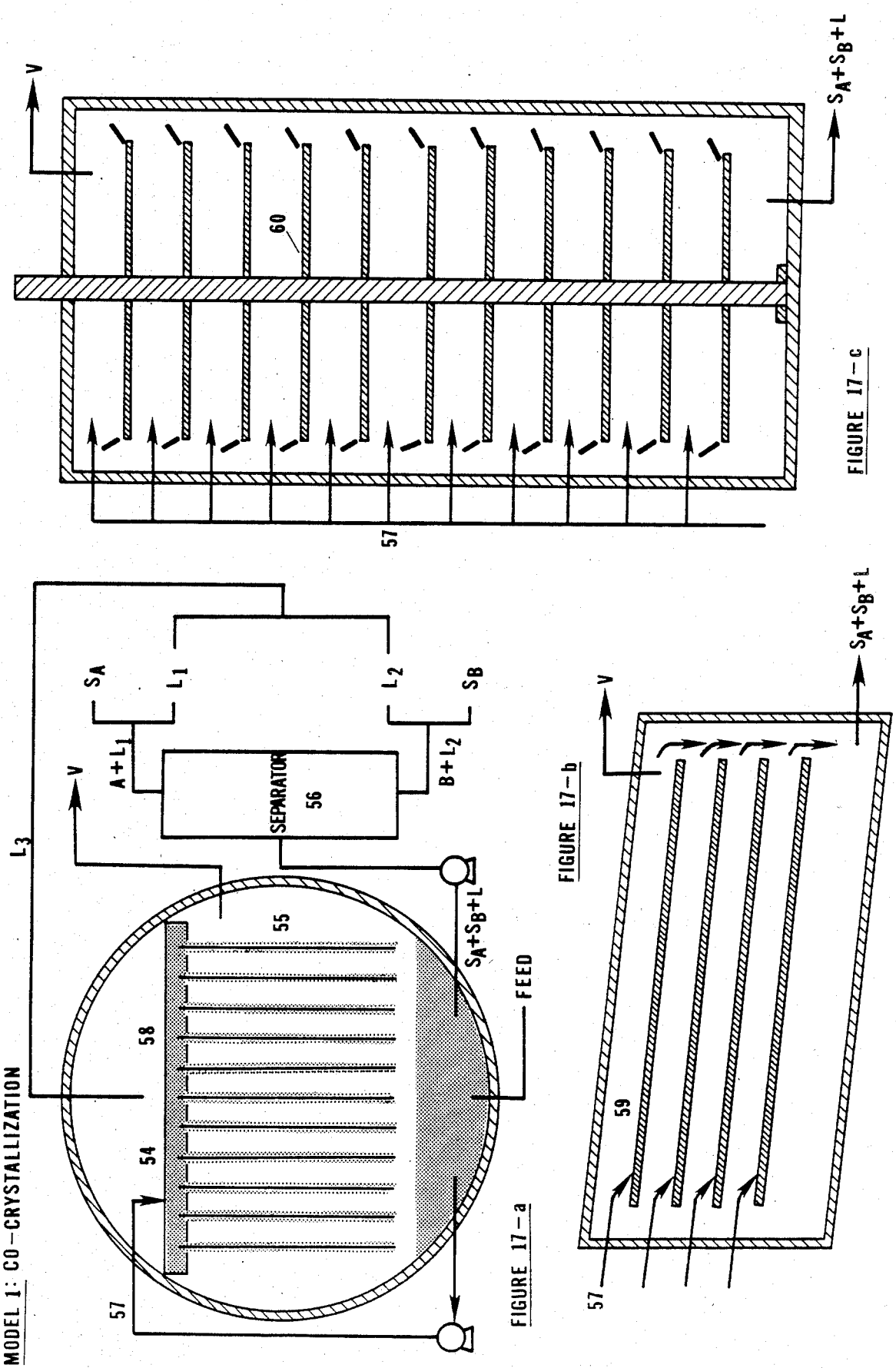

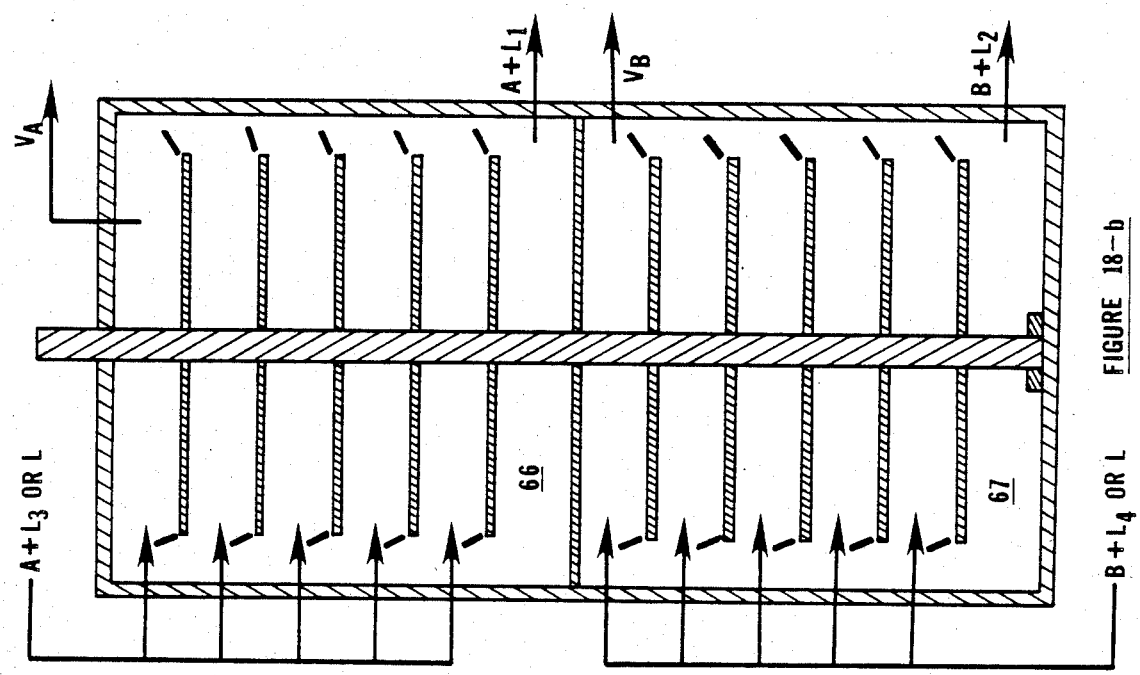
FIGURE 18-b
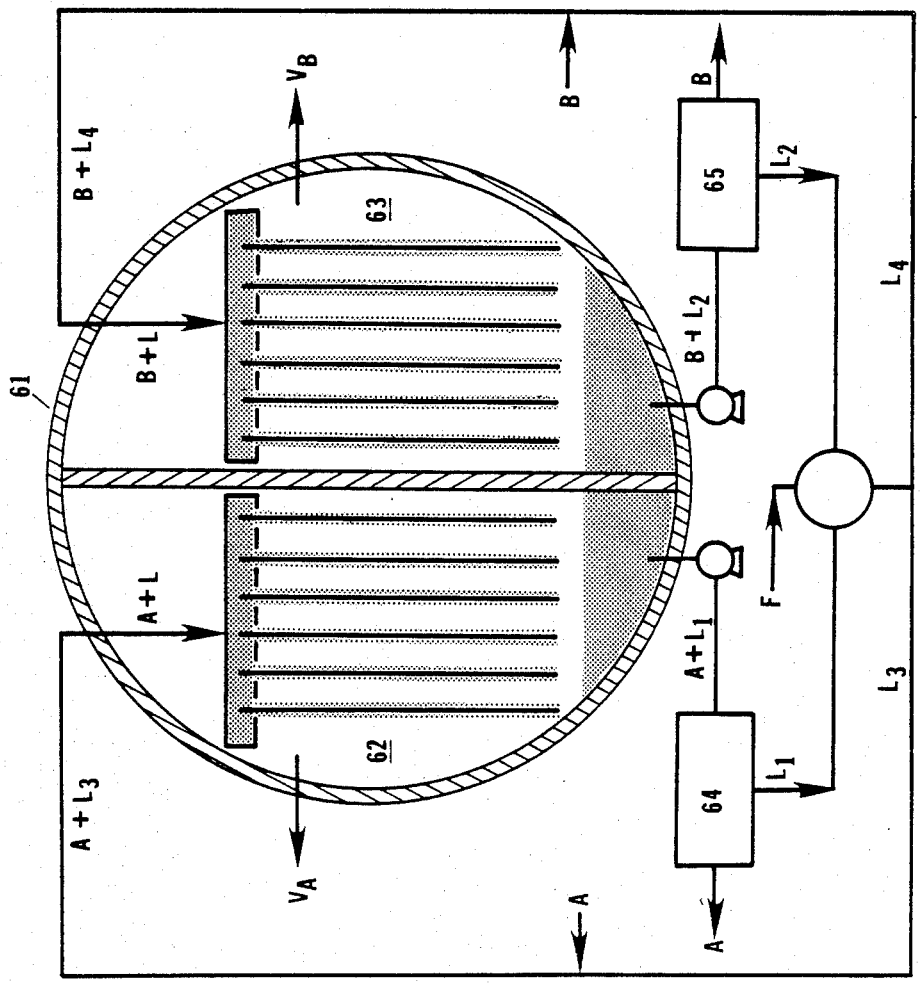
MODE 2: PARALLEL CRYSTALLIZATION
FIGURE 18-a

MODE 3: SUCCESSIVE CRYSTALLIZATION
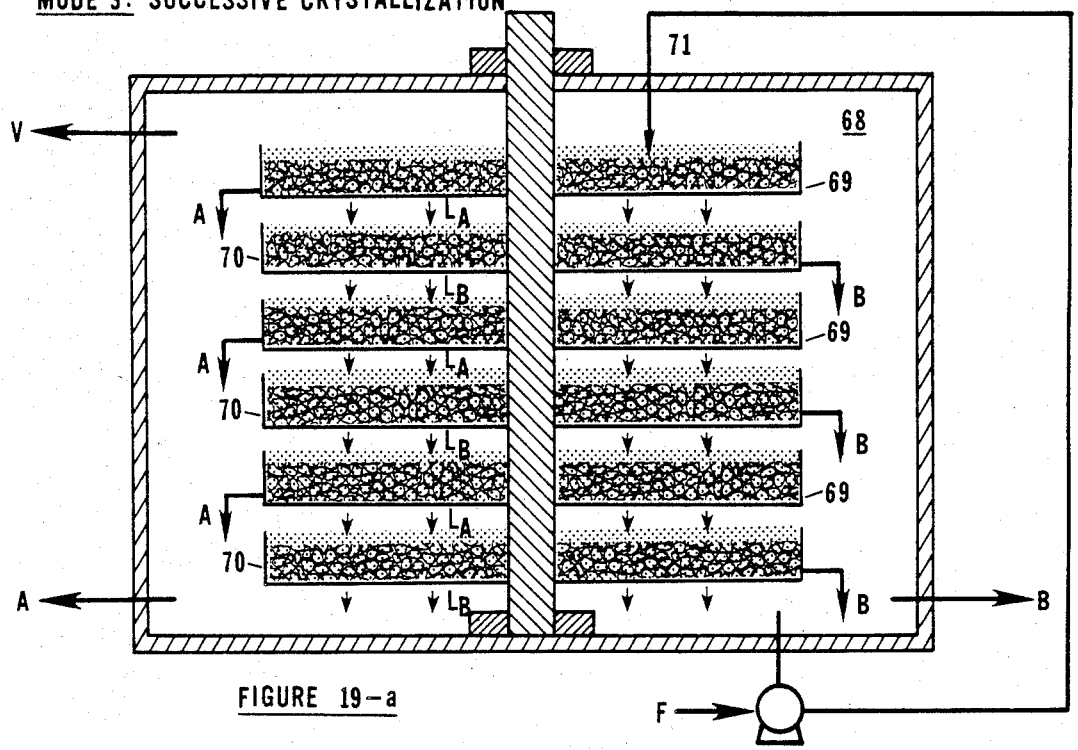
FIGURE 19-a
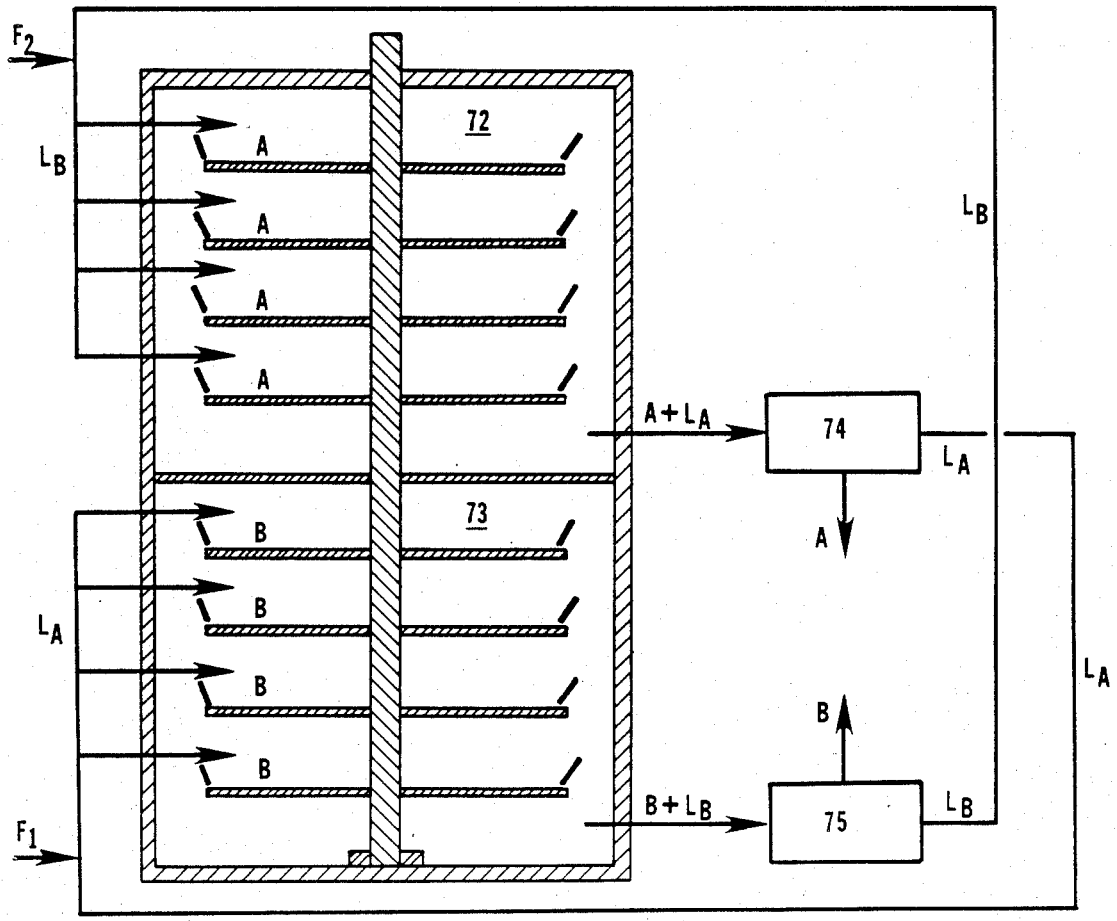
FIGURE 19-b

PRIMARY REFRIGERANT EUTECTIC FREEZING PROCESS [PREUF PROCESS]

BACKGROUND OF THE INVENTION

1. Field of Invention

Various methods have been used to separate mixtures in chemical and other industries. These are distillation, freezing [or fractional solidification], crystallization, extraction, absorption and adsorption processes. A freezing process has several unique advantages such as (1) a broad field of application, (2) a high degree separation in a single step operation, (3) insensitivity to corrosion, (4) minimal pretreatment required, and (5) low energy input required. However, the major disadvantage of a freezing process is that it is not easy to separate a mixture beyond the eutectic composition of the system. Professor A. J. Barduhn of the University of Syracuse has introduced a eutectic freezing process using a secondary refrigerant. In the process, a secondary refrigerant such as Freon 114 is brought in direct contact with a eutectic mixture to form two or more solid phases. It has been demonstrated that this process can be used in separating eutectic mixtures such as water-NaCl, and water-KCl. There are some disadvantages to this process, such as (1) low recovery, (2) small crystal sizes, (3) needs to recover the refrigerant from product streams, and (4) refrigerant loss.

The process introduced herein *does not* bring a secondary refrigerant into direct contact with a eutectic mixture. Rather, the volatile component or components or the feed are vaporized to cool the mixture and thereby form two or more solid phases from the mixture. Since the volatile component or components of the feed are used as the refrigerant it is called the Primary Refrigerant Eutectic Freezing Process [PREUF Process]. Most of the disadvantages of the conventional eutectic freezing process have been removed.

2. Brief Description of Prior Art

When a freezing process is used in separating a mixture, it is difficult to separate the mixture beyond the eutectic composition of the system. A eutectic freezing process is used to overcome this problem.

Eutectic freezing using a secondary refrigerant was first proposed by Professor A. J. Barduhn of Syracuse University and some of the important aspects were tested at the University. This work is described in the following references:

Reference No. 1:
Allen J. Barduhn, "Waste Water Renovation-Part 1. A Design Study of Freezing and Gas Hydrate Formation," AWTR-4, Environmental Health Series, U.S. Dept. HEW-Public Health Service, October 1963.

Reference No. 2:
Allen J. Barduhn and A. Manudhane: "Temperatures Required for Eutectic Freezing of Natural Waters" Published in Desalination, 28 (1979) 233–241.

This process is referred to as the Secondary Refrigerant Eutectic Freezing Process [SREUF Process]. In contrast, the process of the present invention is referred to as the Primary Refrigerant Eutectic Freezing Process [PREUF Process].

The SREUF Process may be considered as a variation on the normal freezing process for desalting seawater or brackish waters and to understand the former, one has to be familiar with the latter. The normal freezing processes have been described in the following reference:

Reference No. 3:
Allen J. Barduhn, "The Freezing Processes for Desalting Saline Water," XII, the Congress, Int. Inst. Refrigeration, Madrid, September, 1967. Proceedings 1, P2B pages 1–19 (1967).

The thermodynamics of eutectics have been explained by Barduhn in references 1 and 2 and by Stepakoff in the following reference:

Reference No. 4:
G. L. Stepakoff, D. Siegelman, R. Johnson and W. Gibson, Fourth Int. Symp. on Fresh Water From the Sea, Heidelberg, 3 (1973) 421–33.

As long as heat removal occurs by direct contact heat transfer, the ice and salt crystals can be nucleated and grown as separate, distinct phases in a continuously stirred tank crystallizer. Due to the fact that the ice and salt crystals are not mechanically interlocked, as in the case of metallic eutectics, physical methods of separation are possible. Using the simple system $NaCl-H_2O$ the essential feature is that at $-21$ degrees Celsius, both ice and $NaCl-2H_2O$ crystals precipitate from solution as heat is removed. One may thus maintain these two solid products in a slurry using a recycled brine stream (23.3% NaCl) and remove heat from them to produce additional crystals. The slurry effluent can be separated into one stream containing brine plus ice and another of brine plus solid salt (sodium chloride di-hydrate $NaCl\cdot2H_2O$) since ice floats and the salt sinks. There is no brine product.

These ideas are incorporated into a simple SREUF Process. The feed is precooled by exchange with products and heat is removed by evaporation of a refrigerant such as n-butane or R-114 ($CClF_3\text{-}CClF_3$) in direct contact with the aqueous solution. The effluent from the eutectic freezer is separated into the two streams and the salt slurry is filtered to produce the wet solid salt product. The ice slurry is sent to a wash column to remove salt prior to melting. Further details are available on how a wash column works and the various methods of direct contact melting of ice in references 3 and 4.

The AVCO Corporation was interested in treating inorganic industrial waste and then developed the process successfully through the pilot plant stage. This work was reported in reference 4 given earlier. They found that the ice and salt crystals which are formed in the concentrated eutectic solution were rather small (125 microns and 40 microns respectively) and presumed that ice-brine separation would be difficult in a conventional wash column. They devised and successfully operated a modified separation column, called a floatation column, in which all the operations of ice separation, washing and melting occur.

The SREUF Process may be used in separating mixtures of binary eutectic, ternary eutectic, quaternary eutectic, etc. In processing a binary eutectic, two solid phases are formed; in processing a ternary eutectic, three solid phases are formed, etc.

BRIEF DESCRIPTION OF THE INVENTION

The Primary Refrigerant Eutectic Freezing Process [PREUF Process] is a eutectic freezing process in which the necessary cooling of the feed mixture near a eutectic composition is accomplished by vaporizing the volatile component or components from the feed mixture. Since no secondary refrigerant is used in the process, it is called the Primary Refrigerant Eutectic Freezing Process. The PREUF Process has the following advantages over the conventional Secondary Refrigerant Eutectic Freezing Process, denoted simply as SREUF Process:

(1) It is easier to control the degree of supercooling.

(2) It is easier to control the degree of nucleation and grow larger crystals.

(3) It makes it easier to separate crystals of different components.

(4) There is no need to recover the secondary refrigerant and there is no worry about refrigerant loss.

The PREUF Process can be used in separating binary eutectic mixtures, ternary eutectic mixtures and eutectic mixtures with a larger number of components. The process is described by referring to the processing of a binary eutectic mixture containing A-component and B-component. For the process to work, at least one component, say B-component, is volatile. The other component, A-component, may or may not be a volatile component. Processing of a eutectic mixture with a larger number of components are similar. A mixture of a eutectic composition at its eutectic temperature has a vapor pressure that will be called the eutectic vapor pressure. In the process, a mixture of A and B of a composition near the eutectic composition is cooled down to a temperature near the eutectic temperature and is flash vaporized at a pressure that is slightly lower than the eutectic vapor pressure to thereby form a slush containing A-crystals, B-crystals and a mother liquor. A mass of A-crystals and a mass of B-crystals are then separated from the slush. A method used in this crystal separation operation may be similar to what is used in the SREUF Process. Since the degree of supercooling can be controlled well and since there are no thermal and pressure shocks caused by boiling of a secondary refrigerant in the PREUF Process, the degree of nucleation can be well controlled and larger crystals of A-component and B-component can be grown. Therefore, A-crystals and B-crystals can be separated from the freezer slush more easily than in the SREUF Process.

There are three major modes of conducting the PREUF Process: i.e. a co-crystallization mode, a parallel crystallization mode and a successive crystallization mode. These modes of operation are outlined as follows:

1. The Co-Crystallization Mode

In the co-crystallization mode of operation, a mixture of A and B of a composition near the eutectic composition is cooled down to a temperature near the eutectic temperature and is flash vaporized at a pressure that is slightly lower than the eutectic vapor pressure to thereby form a slush containing A-crystals, B-crystals and the mother liquor. A mass of A-crystals and a mass of B-crystals are then separated from the slush. A method used in this crystal separation operation may be similar to what is used in the SREUF Process. Since the degree of supercooling can be controlled well and since there is no shocking caused by boiling of a secondary refrigerant in the PREUF Process, the degree of nucleation can be well controlled and larger crystals of A-component and B-component can be grown. Therefore, A-crystals and B-crystals can be separated from the freezer slush more easily than in the SREUF Process.

2. The Parallel Crystallization Mode

The parallel crystallization mode of operation is explained by referring to processing of a binary mixture, say a sucrose-water mixture. In this method, the freezer used has an A-sub-zone in which A-crystals (water crystals) are formed and grown and a B-sub-zone in which B-crystals (sucrose crystals) are formed and grown. A large amount of A-crystals is placed in A-sub-zone and a large amount of B-crystals is placed in B-sub-zone. Mixtures near the eutectic composition are respectively added in the two sub-zones and flash vaporized to form and grow A-crystals in the A-sub-zone and form and grow B-crystals in the B-sub-zone. Rather low degrees of supercooling are maintained in the two sub-zones to suppress nucleation of B-crystals in A-sub-zone and suppress nucleation of A-crystals in B-sub-zone. Degrees of supercooling in the two sub-zones can be controlled accurately by controlling the pressure, which in turn is controlled by controlling the condenser temperature. Due to crystallization of A-component without simultaneous crystallization of B-component from a near eutectic mixture in the A-sub-zone, the mother liquor leaving the A-sub-zone, denoted as $M_A$, becomes richer in B and its B-concentration is higher than that of the eutectic mixture. Similarly, due to crystallization of B-component in the B-sub-zone, the mother liquor leaving the B-sub-zone, denoted as $M_B$, is enriched by A-component. These two mother liquor streams are then mixed together to form a near eutectic mixture which is then recycled to the A and B-sub-zones.

3. The Successive Crystallization Mode

The successive crystallization mode of operation may be used in separating binary, ternary or higher eutectic mixtures. When it is used in separating a binary eutectic, it may also be called an alternate crystallization mode. This mode of operation is explained by referring to separation of a binary eutectic mixture. The operation of separating a ternary or higher eutectic is similar.

The alternate crystallization is conducted in a crystallizer that has a A-sub-zone in which A-crystals are formed and grown and a B-sub-zone in which B-crystals are formed and grown. Mother liquor leaving A-sub-zone, denoted as $M_A$, is fed into B-sub-zone and mother liquor leaving B-sub-zone denoted as $M_B$, is fed into A-sub-zone to form a mass of A-crystals and a mass of B-crystals in the two sub-zones respectively.

The PREUF Process is very effective in removing volatile minor impurities from a feed mixture. The reasons are as follows:

(a) The low pressure operation enhances vaporization of the minor volatile components;

(b) Due to the formation of A-component and B-component, the amount of solvent that retains the volatile impurities is reduced and causes the concentrations of the volatile impurities to increase.

The volatile impurities can be removed from the low pressure vapor by providing a vapor absorption region between the freezer region and the condenser region.

Eutectic conditions of some binary systems are listed as follows:

(1) Sucrose-Water System
Eutectic Point Temperature: −13.9 degrees Celsius
Eutectic Liquid Composition: 63.4 wt. % sucrose
Eutectic Vapor Pressure: 0.9–1.4 torr (2) Sodium Chloride-Water System
Eutectic Point Temperature: −21.1 degrees Celsius
Eutectic Liquid Composition: 23.3 wt. % NaCl
Eutectic Vapor Pressure: Approx. 0.7 torr (3) Acetic Acid-Water System
Eutectic Point Temperature: Approx. −31 degrees Celsius Eutectic Liquid Composition: Approx. 60 wt. % Acetic Acid
Etuectic Vapor Pressure: Approx. 0.257 torr
(4) Caprolactum-Water System
Eutectic Point Temperature: −13.7 degrees Celsius
Eutectic Liquid Composition: 52.4 wt. % Caprolactum
Eutectic Vapor Pressure: Approx. 1.4 torr
(5) p-xylene - m-xylene System
Eutectic Point Temperature: −52.2 degrees Celsius
Eutectic Liquid Composition: 12% p-xylene
Eutectic Vapor Pressure: Approx. 0.02 torr
(6) p-xylene - o-xylene System
Eutectic Point Temperature: −34.7 degrees Celsius
Eutectic Liquid Composition: 23% p-xylene
Eutectic Vapor Pressure: =0.17 torr Since the PREUF Process is conducted under a pressure that is slightly lower than the eutectic vapor pressure, it is necessary to have an effective way of handling the low pressure vapor formed in the eutectic freezing operation. When a vapor formed in a eutectic freezing operation is cooled by a few degrees, it desublimes to form solids of A-component and B-component on the cooling surface. Therefore, the system pressure can be maintained at the low pressure by desubliming the vapor and the system pressure can be precisely adjusted by controlling the condenser operation. A unique and efficient way of handling low pressure vapor has been introduced by Chen-Yen Cheng and Sing-Wang Cheng in U.S. Pat. No. 4,505,728 in connection with the development of the Vacuum Freezing Multiple Phase Transformation Process (VFMPT) Process). This method can be modified and used to handle the low pressure vapor formed in the PREUF Process.

BRIEF DESCRIPTION OF FIGURES

FIG. 1 illustrates a solid-liquid phase diagram of a binary system of A and B components indicating the presence of a binary eutectic mixture with its eutectic temperature and eutectic composition.

FIG. 2 illustrates a solid-liquid phase diagram of a ternary system of A, B and C-components and shows the presence of three binary eutectic mixtures and one ternary eutectic mixture. The vapor pressure of a eutectic mixture at its eutectic temperature is referred to as the eutectic vapor pressure.

FIGS. 3-$a$, 3-$b$ and 3-$c$ respectively illustrate the P-T projection, the P-C projection and the T-C projection of the P-T-C space model of a binary system containing A and B components. They show the presence of the quadruple point or 4-phase point (Q-point) at which A-enriched solid (denoted as A-solid), B-enriched solid (denoted as B-solid), liquid and vapor phases co-exist. In the PREUF Process, a eutectic mixture of A and B is vaporized at a pressure that is slightly lower than the quadruple point pressure (4-phase pressure) of the binary system to form A-crystals and B-crystals. Even though theoretically the eutectic temperature is a function of pressure, it is substantially unaffected by a small change in pressure. Therefore, in a binary system, the eutectic pressure may be used as the 4-phase pressure.

FIG. 4 illustrates the operations of the PREUF Process using the Co-Crystallization Mode, or Mode 1, in which both components, A and B, of the eutectic mixture are crystallized out of solution in the same region as the temperature is lowered below the eutectic temperature shown in FIG. 5. The reduction in temperature and the heat removal required for crystallization is provided by the vaporization of a portion of feed upon reduction in pressure to below the 4-phase pressure. The vapor, V, may contain A or B or both A and B. The slurry produced by this operation contains solid A, $S_A$, solid B, $S_B$, and mother liquor, L. If there is a significant difference in the densities of $S_A$ and $S_B$, the slurry can be separated into two streams, one containing $S_A$ and a part of the mother liquor, $L_1$, and another containing $S_B$ and the other part of the mother liquor, $L_2$. Then $S_A$ is separated from $L_1$ to form one product and $S_B$ is separated from $L_2$ to form the other product. $L_1$ and $L_2$ are recycled back to the freezer.

FIG. 6 illustrates the operations of the PREUF Process using the Parallel Crystallization Mode, or Mode 2, in which A-crystals and B-crystals are grown in separate freezers: A-crystals in the A-freezer and B-crystals in the B-freezer. In the A-freezer, a supply of A-crystals are maintained as seed crystals for the growth of A-crystals; growth of B-crystals in the A-freezer is suppressed because no B-crystals are present as seed crystals and the degree of supercooling is limited and mechanical and pressure shocks are avoided to insure that nucleation of B does not occur. Similarly, in the B-freezer, only B-crystals are maintained as seeds for the growth of B-crystals, and the formation of A-crystals is suppressed.

FIG. 7-$a$ shows the extension of the A-L equilibrium line below the eutectic temperature. $T_A$ represents the temperature maintained in the A-freezer. As A-crystals are formed and grow, the concentration of B in the mother liquor will be increased from $X_e$ towards the equilibrium concentration $X'$. Thus, $L_1$ will have a B concentration greater than that of the eutectic mixture.

Similarly, FIG. 7-$b$ shows the extension of the B-L equilibrium line below the eutectic temperature to the temperature, $T_B$, maintained in the B-freezer. As B-crystals are formed and grow in the B-freezer, the concentration of A in the mother liquor will increase from $X_e$ to $X''$. Thus, $L_2$ will have an A concentration greater than that of the eutectic mixture. The solid, $S_A$, formed in the A-freezer is separated from $L_1$ to form one product, and the solid, $S_B$, formed in the B-freezer is separated from $L_2$ to form the second product. Since $L_1$ is enriched in B and $L_2$ is rich in A relative to the eutectic composition, an appropriate combination of $T_A$, $T_B$ and relative feed rates into the A-freezer and B-freezer can be chosen so that the mixing of $L_1$ and $L_2$ will result in a liquid near the eutectic composition which can then be recycled.

FIG. 7-$c$ illustrates the mixing of $L_1$ and $L_2$ to form a eutectic mixture. As in Mode 1 operation, refrigeration for Mode 2 operation is provided by vaporization of a portion of the feed at a pressure below the 4-phase pressure in both the A-freezer and the B-freezer.

The Successive Crystallization Method is the third mode of conducting the PREUF Process. When it is used in separating a binary mixture, it may also be called the Alternate Crystallization Method.

FIG. 8 illustrates the Alternate Crystallization Method. The processing zone has an A-crystallizer and a B-crystallizer with a mass of A-crystals and a mass of B-crystals respectively maintained in the two crystallizers. By maintaining a low degree of supercooling and preventing pressure and mechanical shocks, nucleations of B-component and A-component are suppressed in A-crystallizer and B-crystallizer respectively. By growing A-crystals while suppressing the formation and growth of B-crystals, a mother liquor $L_A$ which is enriched in B is formed; by growing B-crystals while suppressing the formation and growth of A-crystals, a mother liquor $L_B$ which is enriched in A is formed. $L_A$ and $L_B$ are then introduced into B-crystallizer and A-crystallizer respectively. Portions of the feed may be added to $L_A$ and $L_B$ and introduced to the B-crystallizer and the A-crystallizer respectively. This mode of operation may be extended to separate ternary eutectic or higher eutectics. Again cooling and heat removal are accomplished by vaporization of a portion of the volatile components.

FIGS. 9-a and 9-b illustrate these operations on the phase diagram.

FIGS. 10, 11, 12 and 13 respectively show constant pressure solid-liquid phase diagrams of sucrose-water, sodium chloride-water, acetic acid-water and caprolactum-water systems. FIG. 11 shows that sodium chloride and water form an incongruently melting binary compound, a di-hydrate $NaCl.2H_2O$. FIG. 13 shows that caprolactum and water also form an incongruently melting binary compound and shows a metastable region. These figures show the eutectic temperatures of these systems. The eutectic pressure of a binary system of A and B is the sum of the vapor pressures of solid A and solid B. Since sucrose, sodium chloride and caprolactum have low volatilities compared with water, the eutectic pressures of the systems of FIGS. 10, 11 and 13 are essentially equal to the vapor pressures of ice at their respective eutectic temperatures. In the case of the acetic acid and water system, the eutectic pressure is the sum of the vapor pressures of solid acetic acid and ice.

FIGS. 14-a and 14-b show vapor pressures of ice at various temperatures. As has been described, the figures may be used to find the eutectic vapor pressures of aqueous systems.

FIG. 15 shows phase diagrams of the binary m-xylene - p-xylene system under various pressures and show three phase (solid-liquid-vapor) lines under the pressures. As the pressure decreases the three phase line becomes longer and the three phase temperature approaches the eutectic temperature.

FIG. 16 shows similar phase diagrams for the binary o-xylene - p-xylene system.

FIG. 17-a shows a possible equipment set-up for the Co-Crystallization operation (Mode 1 operation). The vacuum freezing vessel contains vertical plates which provide surface area for vaporization and freezing. The liquid feed is combined with crystals at the bottom of the tank to provide seeds for crystal growth and then pumped to the top of the vessel for distribution down the plates. The slurry thickens as it flows down the plates and is taken to a separator column in which A and B-crystals are separated.

FIG. 17-b shows an alternative arrangement of the plates at a tilted angle.

FIG. 17-c shows a third possible plate arrangement with rotating trays and a scraper at each plate to scrape the crystals from the tray. Low pressure vapors are discharged from these vessels.

FIG. 18-a shows a possible arrangement for the Parallel Crystallization operation (Mode 2 operation). As in the example for Mode 1 operations, vertical plates can be used to provide surface area for evaporation and crystallization. The feed going to the A-freezer is a near eutectic mixture combined with a portion of the A product from the A-freezer which provides seed A-crystals. Similarly, the feed going to the B-freezer is a near eutectic mixture combined with a portion of the B product from the B-freezer.

FIG. 18-b shows that horizontal plates with scrapers for slurry removal can also be used for Parallel Crystallization. A tilted plate arrangement (not shown in the figure) may also be used.

FIG. 19-a shows a possible arrangement for performing the Successive or Alternate Crystallization operations (Mode 3 operation). In the system illustrated, there are two sets of rotating crystallizer plates, A-plates and B-plates, provided with filter plates, that are placed alternately. A mass of A-crystals and a mass of B-crystals are placed on each A-plate and each B-plate respectively. A new eutectic mixture is added on the top plate and liquid flows successively through the lower plates. Formation and growth of A-crystals take place on A-plates and formation and growth of B-crystals take place on B-plates. A-crystals and B-crystals are scraped off each A-plate and B-plate respectively.

FIG. 19-b illustrates another system for conducting the successive or Alternate Crystallization operations. In this system, A-plates and B-plates are placed in separate compartments respectively, denoted as the A-compartment and the B-compartment. A mass of A-crystals is placed on each A-plate and a mass of B-crystals is placed on each B-plate. A mass of A-crystals and a mother liquor, $L_A$, enriched with B is discharged from the A-compartment; a mass of B-crystals and a mother liquor, $L_B$, enriched with A is discharged from the B-compartment. After separating from A-crystals, a major portion of the mother liquor $L_A$ is introduced onto B-plates; after separating from B-crystals, a major portion of the mother liquor $L_B$ is introduced onto A-plates. Feed may be added to $L_A$ and/or $L_B$ before they are introduced onto B-plates and A-plates respectively.

PREFERRED EMBODIMENT OF THE INVENTION

I. Introduction

The Primary Refrigerant Eutectic Freezing Process (PREUF Process) is an improved eutectic freezing process in which the required heat removal is accomplished by vaporizing a portion of the volatile component(s) of the mixture at a pressure slightly lower than the eutectic pressure, which is defined as the vapor pressure of the eutectic mixture at the eutectic temperature. The PREUF Process has the following advantages over the conventional Secondary Refrigerant Eutectic Freezing Process (SREUF Process):

1. The degree of supercooling can be precisely controlled by a fine adjustment of the system pressure, which is accomplished by controlling the condenser temperature and the opening of the valve between the crystallizer and the condenser.

2. It is easier to control nucleation rates of the components and suppress undesirable nucleation by a proper seeding, a precisely controlled degree of supercooling, and suppressing thermal, pressure and mechanical shocks.

3. It is possible to grow larger crystals by a proper seeding, a fine adjustment of the degree of supercooling and by suppressing undesirable nucleation. Therefore, when the Co-Crystallization Mode is used, the slush formed can be separated into two or more streams, each containing mostly a mass of the solid of one component and a mass of mother liquor.

4. It is possible to use separate crystallization zones, in each of which crystallization of one component takes place predominantly by a proper seeding and suppression of undesirable nucleation. The Parallel Crystallization Mode or the Successive Crystallization Mode can be used.

5. Since no secondary refrigerant is used, there is less thermal shock and less pressure shock caused by vaporization of the secondary refrigerant and there is no refrigerant loss problem.

II. Process Description

The PREUF Process can be used in separating a multicomponent mixture by forming masses of crystals of two or more components either in a common crystallization region or separate crystallization regions. There are a normal process and a modified process. In a normal process, the number of components that is crystallized out is the same as the number of major components in the feed mixture. Thus, in the normal process of separating a ternary mixture of A, B and C, a mass of A-crystals, a mass of B-crystals and a mass of C-crystals are formed either in a common region or separate regions. However, in a modified process, the number of components that is crystallized out is less than the number of major components in the feed mixture. Thus, in a modified PREUF Process for separating a ternary mixture of A, B and C, masses of crystals of two components, A and B, B and C, or A and C, may be formed in a common crystallization region or separate crystallization regions. Similar statements can be made in separating mixtures containing four or more components. It is noted that in dealing with a multicomponent mixture that contains a number of minor components, the minor components may be allowed to accumulate in the mother liquor and be purged from the system. Thus, the minor components do not have to be included in counting the number of components. Furthermore, it is noted that a ternary mixture of A, B and C may be treated as a pseudo-binary mixture of A and (B+C) when there is no need to separate masses of crystals of B and C. Similar statements may be applied to a mixture containing four or more components.

FIG. 1 illustrates the solid-liquid phase diagram of a binary system, A and B, under a given pressure. It shows the eutectic temperature 1-3-2 at which an A-enriched solid phase 1 [denoted simply as A-solid], a B-enriched solid phase 2 [denoted simply as B-solid] and a liquid phase 3 [denoted as the eutectic mixture] coexist, the melting point 4 of pure A, and the melting point 5 of pure B. It also shows an A+L region 1-3-4, a B+L region 2-3-5, and an A+B region 6-1-3-2-7. Since the solubility of B in A-enriched solid and the solubility of A in B-enriched solid are extremely low in most systems, lines 6-1-4 and 7-2-5 almost coincide with the vertical A-line and B-line respectively. When a eutectic mixture e represented by 3 is cooled under a near equilibrium condition, A-solid 1 and B-solid 2 are formed in the ratio of 3-2 and 3-1, while the remaining mother liquor remains at the composition of e. However, by a selective seeding of A and suppressing of nucleation of B, A-crystals can be formed predominantly and the remaining mother liquor becomes enriched in B. In a simlar way, B-crystals can also be formed predominantly.

FIG. 2 illustrates the solid-liquid phase diagram of a ternary system containing A, B and C. It shows melting points 8, 9, 10 of components A, B and C, binary eutectic points $e_1$ 11, $e_2$ 12 and $e_3$ 13 of A and B, B and C, and A and C respectively and a ternary eutectic point E, 14. A normal PREUF Process is applied to a mixture near E to form masses of A, B and C-crystals in a single crystallization region or two or three separate crystallization regions. A modified PREUF Process is applied to a mixture near a point along $e_1E$, 11-14, say d, to form masses of crystals of two components, say A and B. In the modified process, the mother liquor composition changes along line 11-14 rather than staying at a constant composition. The operating temperature and pressure then depend on the mother liquor composition.

FIGS. 3-a, 3-b and 3-c respectively illustrate the P-T projection, the P-C projection and the T-C projection of the three-dimensional P-T-C model of a binary system, A and B. FIG. 3-a shows the triple points of A 15 and B 19, denoted as $O_A$ and $O_B$, vaporization lines of A 15-16 and B 19-20, melting lines of A 15-17 and B 19-21, sublimation lines of A 15-18 and B 19-22. It also shows the quadruple point 23, denoted as the Q point, three phase $A_1$-$L_A$-$V_A$ line 15-23, three phase $B_1$-$L_B$-$V_B$ line 19-23, three phase $A_2$-$B_2$-$L_{AB}$ line 23-24 and three phase $A_3$-$B_3$-$V_{AB}$ line 23-25. $A_1$-$L_A$-$V_A$ lines 15-26, 15-28 and 15-29, $B_1$-$L_B$-$V_B$ lines 19-27, 19-28 and 19-29, $A_2$-$B_2$-$L_{AB}$ lines 26-30, 27-31 and 28-32, and $A_3$-$B_3$-$V_{AB}$ lines 26-33, 27-34 and 29-35 are shown in the P-C projection and T-C projection shown in FIGS. 3-b and 3-c. In many systems, $A_1$, $A_2$ and $A_3$ lines are almost the same as the pure A-line and $B_1$, $B_2$ and $B_3$ lines are almost the same as the pure B-line.

When the PREUF Process is applied to the eutectic mixture of A and B described by these figures, the eutectic freezing operation is conducted under a pressure that is just slightly lower than the pressure at the quadruple point. Since the eutectic temperature and eutectic composition of the binary A-B system are substantially unaffected by a small change in the applied pressure, the quadruple point pressure may also be taken as equal to the vapor pressure of the eutectic mixture at the eutectic temperature at the ambient pressure. This pressure is also equal to the sum of vapor pressures of pure A-solid and pure B-solid at the three phase equilibrium temperature of A-solid, B-solid and the liquid.

The key difference between the PREUF Process and the SREUF Process is in the way cooling needed in the formation of masses of crystals is accomplished. In the PREUF Process, a portion of the feed liquid and recycle liquid are vaporized to remove the latent heat released in the crystallization operation; in the SREUF Process, the necessary cooling is accomplished by vaporizing a secondary refrigerant.

There are the following three modes of operation of the PREUF Process:
  (a) Mode 1: Co-Crystallization
  (b) Mode 2: Parallel Crystallization
  (c) Mode 3: Successive Crystallization
In the case of separating a binary mixture, Mode 3 may also be called the Alternate Crystallization Mode.

FIG. 4 illustrates how a binary mixture containing A and B can be separated using the Co-Crystallization Mode. A binary mixture F, near the eutectic composition and recycle liquids $L_1$ and $L_2$ to be described are mixed and fed into a co-crystallizer 36, wherein a part of the mixed liquor is vaporized to form a low pressure vapor V and a first slush, denoted also as a first condensed mass, containing masses of A-crystals and B-crystals. The slush containing A-solid ($S_A$), B-solid ($S_B$) and liquid is separated into a slush containing $S_A$ and $L_1$ and a second slush containing $S_B$ and $L_2$ in a separator 37 such as a cyclone separator. $S_A$ and $S_B$ are separated from these slushes and the mother liquors $L_1$ and $L_2$ so obtained are recycled. The low pressure vapor V is condensed into masses of A-solid and B-solid and are melted and recovered. An effective way of handling the low pressure vapor has been described by Chen-Yen Cheng and Sing-Wang Cheng in U.S. Pat. No. 4,505,728 and its extension to be filed. FIG. 5 shows that when the eutectic mixture 38 is cooled to a temperature $T_{AB}$ below the eutectic temperature 39-38-40 and equilibrium is attained, it 41 separates into a mass of A-solid and a mass of B-solid in the ratio of 38-40 and 38-39. However, by controlling the cooling and thus the degree of solidification, one can obtain a solid-liquid mixture containing a mass of A-solid, a mass of B-solid and some mother liquor.

FIG. 6 shows how a binary mixture of A and B can be separated by the Parallel Crystallization Mode of operation. In the process, a mass of feed F and a recycle stream $L_3$ to be described are mixed to form a mixed feed. A portion of the mixed feed $F_A$ is introduced in the A-crystallizer 42 and the rest $F_B$ is introduced into the B-crystallizer 43. In the A-crystallizer, there is a mass of A-solid but no B-solid. The liquid mixture in the A-crystallizer is flash vaporized to form a first vapor $V_A$ and cause crystallization and growth of A-crystals, while nucleation of B-crystals is suppressed. The required cooling is accomplished by vaporizing a portion of the volatile component(s) from the mixture. Nucleation of B-crystals is suppressed by maintaining a low degree of super-cooling and by avoiding thermal, mechanical and pressure shocks. The operating condition is illustrated by FIG. 7-a. It shows a freezing point curve for A 44-45 and a freezing curve for B 44-46. When a mixture near the eutectic point 44 is introduced into the A-crystallizer 42 maintained at temperature $T_A$, a mass of A-crystals ($S_A$) is formed and the mother liquor $L_1$ 47 is enriched in B-component as indicated by point 1. The solid-liquid mixture is then separated to form a mass of A-solid and a mother liquor $L_1$. In a similar way, the mixed liquid introduced into the B-crystallizer maintained at temperature $T_B$ becomes a solid-liquid mixture ($S_B+L_2$), which is separated to form a mass of B-solid $S_B$ and mother liquor $L_2$. As shown in FIG. 7-b, the mother liquor $L_2$, represented by point 48, is enriched in A-component. As illustrated in FIG. 7-c, these two mother liquors, $L_1$ and $L_2$, are mixed to form a liquid $L_3$ 49 that is of a near eutectic composition. This liquid becomes the recycle liquid described.

FIG. 8 shows how a binary mixture of A and B can be separated using the Successive Crystallization Mode. This mode of operation as applied to a binary mixture may be called the Alternate Crystallization Mode. Referring to the figure, feed is introduced into the A-crystallizer or the B-crystallizer or both. In the A-crystallizer 50, a mass of A-solid is formed while the formation of B-solid is suppressed. The required cooling is accomplished by vaporizing a mass of volatile components $V_A$ from the mixture. The mother liquor $L_A$ 52 leaving the A-crystallizer is enriched with B-component; it is introduced into the B-crystallizer. Similarly, in the B-crystallizer 51, a mass of B-solid is formed while the formation of A-solid is suppressed. As shown in FIG. 9-b, the mother liquor $L_B$ 53 leaving the B-crystallizer is enriched with A-component. It is introduced as feed into the A-crystallizer.

FIG. 10 shows the solid-liquid phase diagram of the sucrose-water system. The eutectic composition is sucrose 63.4% by weight, the eutectic temperature is −13.9 degrees Celsius and the eutectic pressure is 0.9-1.36 torr. Sucrose solutions such as cane juice and beet juice may be concentrated to a near eutectic composition by a vacuum freezing process and the solution is then separated by the PREUF Process. FIG. 11 shows the solid-liquid phase diagram of the NaCl-H₂O system. There is a region in which a binary compound (NaCl.2H₂O) exists. The eutectic composition is 23.3% NaCl by weight, the eutectic temperature is −21.1 degrees Celsius and the eutectic pressure is approximately 0.7 torr. By using the PREUF Process, ice and solid sodium chloride di-hydrate can be separated. FIG. 12 shows the solid-liquid phase diagram of the acetic acid-water system. The eutectic composition is 60% acetic acid by weight, the eutectic temperature is −31 degrees Celsius and the eutectic pressure is approximately 0.257 torr. It is noted that there are various kinds of waste waters that contain acetic acid. Such waste waters can be first concentrated by a vacuum freezing operation and solid acetic acid can then be separated from the concentrate by the PREUF Process. FIG. 13 shows the solid-liquid phase diagram of the caprolactum-water system. It shows a stable eutectic and an unstable eutectic. The stable eutectic composition is 52.4% caprolactum by weight, the stable eutectic temperature is −13.7 degrees Celsius and the eutectic vapor pressure is approximately 1.4 torr.

There are two methods by which the eutectic pressure of a eutectic mixture can be determined. There are:

(a) Liquid Phase Approach:

The eutectic pressure $P_E$ can be found from the eutectic liquid composition and the eutectic temperature by the following relation:

$$P_E = (P_A°)_L \cdot X_A \cdot \gamma_A + (P_B°)_L \cdot X_B \cdot \gamma_B + (P_C°)_L \cdot X_C \cdot \gamma_C$$

where $(P_A°)_L$, $(P_B°)_L$ and $(P_C°)_L$ are vapor pressures of pure A-liquid, B-liquid and C-liquid at the eutectic temperature, $X_A$, $X_B$ and $X_C$ are mole fractions of A, B and C in the liquid mixture and $\gamma_A$, $\gamma_B$ and $\gamma_C$ are activity coefficients of these components.

(b) Solid Phase Approach:

In the normal PREUF Process, the eutectic pressure can also be found by the following relation:

$$P_E = (P_A°)_S + (P_B°)_S + (P_C°)_S$$

where A, B and C represent crystallizing components and $(P_A°)_S$, $(P_B°)_S$ and $(P_C°)_S$ are respectively vapor pressures of pure A-solid, B-solid and C-solid at the temperature at which A, B, and C-solid co-exist with the equilibrium liquid. In an aqueous mixture containing only low volatility solutes, the eutectic pressure is simply equal to vapor pressure of ice at the eutectic temperature.

FIGS. 14-a and 14-b show the vapor pressure of ice in the ranges of 0 degrees Celsius to −30 degrees Celsius and −30 degrees Celsius to −60 degrees Celsius respectively. These figures may be used to find the eutectic pressure for an aqueous mixture containing non-volatile solutes.

FIG. 15 shows solid-liquid-vapor phase equilibria for the binary m-xylene and p-xylene system under various pressures. It also shows the quadruple state under which solid m-xylene, solid p-xylene, liquid and vapor co-exist. FIG. 16 shows a similar phase diagram for the o-xylene and p-xylene system. Separation of solid m-xylene and solid p-xylene from an isometric mixture of p-xylene, m-xylene, o-xylene and ethyl benzene will be very important in the chemical industries. However, as described in connection with FIG. 3, it is important to note that this application belongs to the modified PREUF Process because two components are separated as solid masses from a mixture containing more than two major components. A ternary phase diagram or a quarternary phase diagram may be used.

FIGS. 17-a, 17-b and 17-c show three types of co-crystallizers that may be used in carrying out the PREUF Process according to the Co-Crystallization Mode. FIG. 17-a shows a vertical plate crystallizer; FIG. 17-b shows a sloped surface crystallizer; FIG. 17-c shows a rotating tray crystallizer. The vertical plate crystallizer assembly comprises a vacuum chamber 54 with vertical plates 55 on which slush flows downward and a crystal separator 56 and there are vertical plates 56 on which slush flows downward. A slush 57 containing A-solid ($S_A$), B-solid ($S_B$) and a eutectic mixture, is distributed through a distributor 58 and is applied on the vertical plates. By maintaining the pressure in the vessel slightly lower than the eutectic point pressure, a portion of the volatile components vaporize to cause crystallization of A and B-components. A low degree of supercooling is maintained and mechanical, thermal and pressure shocks are avoided in order to grow A-crystals and B-crystals to relatively large sizes. The low pressure vapor formed is condensed into solid states, melted and removed by a method modified from the method to be described in U.S. Pat. No. 4,505,728. The slush formed is separated into two slush streams, one containing A and $L_1$ and the other containing B and $L_2$. A and B are separated from these slush streams and the liquid streams $L_1$ and $L_2$ are mixed to become $L_3$ and are recycled. FIG. 17-b shows a sloped surfacce co-crystallizer. The operations in this unit is similar to those of FIG. 17-a. A slush feed 57 is added to these sloped surfaces 59 and allowed to flow downward along these surfaces. Vaporization and crystallization take place on the sloped surfaces. FIG. 17-c shows a rotating tray co-crystallizer having rotating trays 60. A slush is added to these trays and vaporization and crystallization take place on these trays. Operations in this unit are also similar to those described.

Separation of a binary mixture by the PREUF Process according to the Parallel Crystallization Mode can be made in the units illustrated by FIGS. 18-a and 18-b. The unit in FIG. 18-a comprises a vacuum crystallizer 61 that is separated into an A-crystallization sub-zone 62 and a B-crystallization sub-zone 63. A slush containing a mass of A-solid and a near eutectic mixture $L_3$ is applied over the vertical surface of the A-crystallizer. The chamber is maintained under a pressure that is slightly lower than the eutectic pressure to cause vaporization with the formation of A-crystals and a first vapor $V_A$. The slush $A+L_1$ so formed is separated into A and $L_1$ at the separator 64. $L_1$ is enriched with respect to B. A similar operation in the B-crystallizer 63 and a separator 65 produce B and $L_2$. A first vapor $V_B$ is formed in the B-crystallizer. $L_2$ is enriched with respect to A. $L_1$ and $L_2$ and feed are mixed to form a mixed feed. A mass of A-crystals is added to a portion of the mixed liquid $L_3$ and introduced into the A-crystallizer; a mass of B-crystals is added to the rest of the mixed liquid $L_4$ and introduced into the B-crystallizer. FIG. 18-b shows a vacuum chamber that comprises an A-crystallizer 66 and a B-crystallizer 67. There are rotating trays in each of these crystallizers. Vaporization and formation of A-solid take place in the A-crystallizer and vaporization and formation of B-solid take place in the B-crystallizer. Other operations are similar to those of FIG. 18-a. One may also use a sloped surface crystallizer similar to that shown in FIG. 17-b.

FIGS. 19-a and 19-b show units in which a mixture can be separated by the PREUF Process according to the Successive Crystallization approach. When masses of solids of two components are formed, this approach may also be called Alternate Crystallization approach. The unit shown in FIG. 19-a has a vacuum chamber 68, a set of A-trays 69 and a set of B-trays 70. These trays are placed alternately. A-trays are seeded with A-crystals and B-trays are seeded with B-crystals. A mixed liquid 71 formed by mixing the feed and a recycled liquid to be described are added to the top tray. The liquid on each A-tray is partially vaporized to grow A-crystals and form a liquid $L_A$ which is enriched with B. The liquid leaving an A-tray is filtered to remove A-crystals and is added to the B-tray below. Similarly, the liquid on each B-tray is partially vaporized to grow B-crystals and form a liquid L which is enriched with A. The liquid leaving a B-tray is filtered to remove B-crystals and is added to the A-tray below. The liquid leaving the last tray becomes the recycle liquid. Feed and recycle liquid are mixed and added to the top tray. The unit illustrated by FIG. 19-b has two crystallization sub-zones, i.e. an A-crystallization sub-zone 72 and a B-crystallization sub-zone 73. Rotating trays are provided on each zone. Vaporization and crystallization of A takes place on A-trays; vaporization and crystallization of B takes place on B-trays. The slush removed from the A-sub-zone contains A-solid and liquid $L_A$ which are separated in a separator 74 into a mass of A-solid and $L_A$. $L_A$ is enriched in B and is introduced into B-crystallizer with additional feed $F_1$. The slush removed from the B-sub-zone contains B-solid and liquid $L_B$, which are separated in a separator 75 into a mass of B-solid and $L_B$. $L_B$ is enriched in A and is introduced into A-crystallizer with additional feed $F_2$.

In the previous discussion, binary systems were used to illustrate the essentials of the PREUF Process. However, the three modes of the PREUF Process can also be applied to multiple component systems having three or more components. For instance, let there be n major components in the system with m components that crystallize in the overall process. These components are referred to as crystallizing components. Let there be k crystallizing sub-zones with possible values for k being 1, 2, 3, . . . up to m. Let the number of components crystallizing in the first crystallizing zone be $C_1$, the number of components crystallizing in the second crystallizing zone be $C_2$ and so forth so that $$C_1 + C_2 + C_3 \ldots C_k = m$$

with K=1, 2, 3, 4, . . . m. Of course, when a component crystallizes in more than one sub-zones, the above equation must be properly modified. It can be seen that there are many possible ways of crystallizing the m crystallizing components using the three modes of the PREUF Process.

For treating a mixture with two crystallizing components (m=2) denoted as A and B, one may use a common crystallization region (k=1) or use two separate crystallization sub-zones (k=2). Therefore, there are the following two possible sets of values for k and $C_i$'s:
Case 1: k=1, $C_1$=2;
Case 2: k=2, $C_1$=1, $C_2$=1.

In Case 1, the co-crystallization mode illustrated by FIGS. 4, 17-a, 17-b and 17-c is used. A mass of A-solid and a mass of B-solid are formed in a common crystallization region. Therefore, $k=1$ and $C_1=2$. In Case 2, two separate crystallization sub-zones are used: the first sub-zone is used to form a mass of solid of A-component and the second sub-zone is used to form a mass of solid of B-component. Therefore, $k=2$, $C_1=1$ and $C_2=1$.

For treating a mixture with three crystallizing components ($m=3$) denoted as A, B and C, one may use a common crystallization region ($k=1$), two separate crystallization sub-zones ($k=2$), or three separate crystallization sub-zones ($k=3$). Therefore, there are the following possible sets of values for k and C's:

Case 1: $k=1$, $C_1=3$;
Case 2: $k=2$, $C_1=1$, $C_2=2$;
Case 3: $k=3$, $C_1=1$, $C_2=1$, $C_3=1$.

In Case 1, the Co-Crystallization Mode is used. Crystals of the three crystallizing components are formed in a common crystallization region. The slush formed contains a mass of A-crystals, a mass of B-crystals, a mass of C-crystals and a mass of mother liquor. Masses of A-solid, B-solid and C-solid are then separated from this slush. In Case 2, there are two crystallization sub-zones. In one sub-zone, one component, say A-component, crystallizes and in the other sub-zone, the remaining two components, B and C, crystallize. The Parallel Crystallization Mode and the Successive Crystallization Mode have been explained by referring to the processing of a binary mixture. These modes of operation may be extended to the processing of a ternary mixture or a mixture with four or more components. In the following discussion, the crystallizing zone refers to the sum of all the crystallizers in the process, whereas the crystallizing sub-zone refers to a single crystallizer or a zone within the crystallizer. A way of separating a ternary mixture involving the Parallel Crystallization Mode in two crystallization sub-zones may be described by referring to FIG. 6. In this case, the first crystallizer 42 is used to form a mass of A-solid and the second crystallizer 43 is used to form masses of B and C crystals. The operations are similar to those described earlier, except that masses of B and C crystals are formed in the second crystallizer 43. The crystallization of B and C in the second crystallizer is a Co-Crystallization operation and the relation between the crystallization operations in the first and second crystallizer is a parallel relation. Therefore, the overall process is a combination of a parallel crystallization in the two crystallizers and a co-crystallization in the second crystallizer. It is noted that the feed and the recycle liquid to be described are mixed to form a mixed feed. The mixed feed is divided into two streams and these two streams are sent to the first crystallizer and the second crystallizer in a parallel way. Mother liquors obtained from the two crystallizers are mixed and the mixture becomes the recycle liquid described.

A way of separating a ternary mixture involving the Successive Crystallization Mode in two crystallization sub-zones may be described by referring to FIG. 8. In this case, the first crystallizer 50 is used to form a mass of A-solid and the second crystallizer 51 is used to form masses of B and C-crystals. The operations are similar to those described earlier for separation of binary mixtures except masses of both B and C-crystals are formed in the second crystallizer 51. The crystallization of B and C in the second crystallizer is a co-crystallization operation and the relation between the crystallization operations in the two crystallizers is a successive or alternate relation. Therefore, the overall process is a combination of a successive crystallization in the two crystallizers and a co-crystallization in the second crystallizer. It is noted that in the successive arrangement, the mother liquor obtained from the first crystallizer is fed into the second crystallizer and vice versa.

In Case 3, there are three crystallization sub-zones. Masses of A-crystals, B-crystals and C-crystals are formed separately in the three sub-zones. The relations among the crystallization operations in the three sub-zones may be the Parallel Crystallization Mode, the Successive Crystallization Mode or a mixed mode that is a combination of the two modes.

For treating a mixture with four crystallizing components ($m=4$), denoted as A, B, C and D, one may use a common crystallization region ($k=1$), two separate crystallization sub-zones ($k=2$), three separate crystallization sub-zones ($k=3$) or four separate crystallization sub-zones ($k=4$). There are the following possible sets of values for k and $C_i$'s:

Case 1: $k=1$, $C_1=4$;
Case 2: $k=2$
    Case 2A: $k=2$, $C_1=1$, $C_2=3$;
    Case 2B: $k=2$, $C_1=2$, $C_2=2$;
Case 3: $k=3$, $C_1=1$, $C_2=1$ and $C_3=2$; and
Case 4: $k=4$, $C_1=1$, $C_2=1$, $C_3=1$ and $C_4=1$.

In Case 1, there is only a common crystallization region and all of the four crystallizing components are crystallized in the common crystallization region. Therefore, $C_1=4$. In both 2A and 2B, there are two crystallization sub-zones. In Case 2A, a component is crystallized in the first crystallization sub-zone and the remaining three crystallizing components are crystallized in the second crystallization sub-zone. In Case 2B, two components are crystallized in the first crystallizing sub-zone and the remaining two components are crystallized in the second crystallization subzone. In Case 3, there are three crystallization sub-zones; the first and second crystallizing components are respectively crystallized in the first and second crystallization sub-zones and the remaining two components are crystallized in the third crystallization sub-zone. In Case 4, there are four crystallization sub-zones and one component is crystallized in each sub-zone. When there are two or more crystallizers, the liquid streams may be fed to the crystallizers in a parallel manner or a successive manner, or even a combination of the two.

In the preceding paragraphs, possible ways of arranging crystallizers have been described by referring to processing of mixtures containing two, three and four crystallizing components. The description given can be further extended to mixtures with five or more crystallizing components. The descriptions given are based on an assumption that a given crystallizing component is crystallized only in one crystallizer sub-zone. The PREUF Process may be so operated that a component is crystallized in two or more crystallizers. For example, in separating a mixture with three crystallizing components, denoted as A, B and C, in two separate crystallizers, it may be so seeded that A and C crystallize in the first crystallizer and B and C crystallize in the second crystallizer. Such an operation has at least accomplished a separation of A and B components. The type of modification described is obvious to one skilled in the art.

A general statement can be made about ways of arranging one or more crystallizers. The PREUF Process can be used to separate a mixture containing n major components. The process may be so conducted to crystallize m components, denoted as the m crystallizing components, from a near eutectic mixture in a crystallization zone that comprises k crystallizing sub-zones (k crystallizers). The m-value is equal to or more than two and is equal to or less than n. The k-value is equal to or more than one and is equal to or less than m. Assuming that a given component is crystallized only in one crystallization sub-zone, letting the sub-zones be named first, second, ---, i-th, --- and k-th subzones and the number of components that crystallize in the subzones be denoted respectively as $C_1$, $C_2$, ---, $C_i$, ---, $C_k$, then there exist the following relation:

$$C_1 + C_2 + \cdots + C_i + \cdots + C_k + m.$$

Of course when a component crystallizes in two or more sub-zones, the above equation has to be properly modified.

It is important to note that an ideal operation has been assumed in the discussion presented. For example, in the discussions presented in reference to FIGS. 6 and 8, it is assumed that A does not crystallize in the B-crystallizer and B does not crystallize in the A-crystallizer. In an actual operation, formation of a small amount of A-crystals in the B-crystallizer and vice versa may be tolerated.

It has been described that, in the PREUF Process, the cooling needed in a eutectic freezing operation is accomplished by vaporizing a part of the volatile components(s) in the liquid mixture in each crystallization sub-zone as shown in FIGS. 4, 6, 8, 17a, 17b, 17c, 18a, 18b, 19a and 19b. This vapor is denoted as the first vapor from each crystallization sub-zone, such as the first vapor from the A sub-zone, the first vapor from the B sub-zone, etc. The first vapors from the sub-zones may be individually reduced to a liquid state or first combined and reduced to a liquid state and then removed from the vacuum system as a liquid. In view of the low pressure and the extremely large specific volume, it is desirable that the liquefaction be accomplished without compressing the low pressure vapor. One may use an absorbing liquid to absorb a first vapor and remove the resulting solution, regenerate the solution and return the absorbing liquid. However, it is more convenient not to use an absorbing solution. A modification of the multiple phase transformation operations introduced by Chen-Yen Cheng and Sing-Wang Cheng in U.S. Pat. No. 4,505,728 is a convenient way of liquifying the first vapors without compressing the first vapor or absorbing it in a solution. The modified multiple phase transformation operations as applied to the PREUF Process are described in the following paragraph.

In order to liquify a first vapor containing two or more volatile components, say A, B and C, generated in a eutectic freezing zone by the modified multiple phase transformation operations, a vapor liquefaction zone is connected to the eutectic freezing zone through a first valve. The vapor liquefaction zone is further connected to a second vapor generation zone through a second valve and is provided with a liquid discharge valve. A heat exchanger cooled by a refrigerant and provided with a refrigerant valve is installed within the vapor liquefaction zone. Another heat exchanger heated with a heating medium is installed within the second vapor generation zone to generate a pure vapor or a vapor mixture that is at a pressure higher than the pressure prevailing in the eutectic freezing zone. The first vapor generated in the eutectic freezing zone is liquified by the following steps conducted cyclically:

Step 1: Desublimation of the first vapor;
Step 2: Pressure isolation of the vapor liquefaction zone;
Step 3: Generation of a second vapor;
Step 4: Interaction between the second vapor and the desublimate to simultaneously condense the second vapor and melt the desublimate and discharge of the resulting liquid from the liquefaction zone; and
Step 5: Pressure Isolating the Vapor Liquefaction Zone.

During Step 1, the first valve is open, the second valve is closed and a cooling medium is introduced into the heat exchanger in the liquefaction zone. The first vapor containing the volatile components A, B and C is desublimed (condensed into a solid state) forming masses of A-solid, B-solid and C-solid on the heat exchanger surface. Toward the end of Step 1, the flow of the cooling medium into the heat exchanger is stopped. A layer of desublimates of a certain thickness has been formed on the heat exchanger surface. At the beginning of Step 2, the first valve is closed. During Step 2, both the first and second valves are closed and the liquefaction zone is pressure isolated from both the eutectic freezing zone and the second vapor generation zone. Step 2 is a transition step and is needed to prevent a rush of second vapor through the liquefaction zone into the eutectic freezing zone. During Step 3, a second vapor is generated in the second vapor generation zone by vaporizing a liquid. This liquid may either be a pure or a mixed liquid. A convenient liquid to be vaporized is a liquid mixture discharged in Step 4 to be described. The pressure of the second vapor has to be such that on interacting with the desublimate, it can be condensed and dissolve the desublimate. At the beginning of Step 4, the second valve and the liquid discharge valve are open while the first valve is still closed and the cooling medium is still not introduced into the heat exchanger. During Step 4, the second vapor enters the liquefaction zone to be condensed as it dissolves the desublimate. This operation is essentially adiabetic; the latent heat released in the condensation of the second vapor is utilized as the latent heat needed in dissolving the desublimate. By the end of Step 4, the thickness of the desublimate has been reduced to a thin layer or has been completely removed. The liquid mixture formed is discharged from the liquefaction zone. A part of this liquid mixture is used in generating the second vapor. At the beginning of Step 5, the second valve is closed and a cooling medium is introduced into the heat exchanger to pressure isolate and cool the liquefaction zone. Then Step 1 of the next cycle of operation is initiated.

The pressure of the second vapor has to be higher than the equilibrium pressure of the system in which five phases, A-solid, B-solid, C-solid, a liquid and a vapor, co-exist. According to the Phase Rule, the degree of freedoom is zero. Therefore, the equilibrium pressure is a unique value. In the above discussion, it has been assumed that the first vapor contains three volatile components. The operations are similar when the first vapor contains any number of volatile components.

What we claim are as follows:

1. A process of separating a multi-component liquid mixture containing n major components by forming crystals of m components, denoted as m crystallizing components, in a crystallization zone, denoted as a first processing zone, having k crystallization sub-zones, the value of m being equal to or greater than 2 and equal to or less than n, the value of k being equal to or greater than 1 and equal to or less than m, comprising a first step of crystallizing the m components in the k crystallization sub-zones to form a first condensed mass and a second step of vaporizing a mass of the volatile component(s) from the liquid mixture to form a first vapor in each sub-zone under a first pressure that is lower than the eutectic pressure defined as the equilibrium pressure at which the m solid phases and the liquid mixture coexist with a vapor phase containing the volatile component(s), wherein the said first step and the second step are conducted simultaneously so that at least a major fraction of the heat released in Step 1 operation is removed by the Step 2 operation in each sub-zone.

2. A process of claim 1, which further comprises a third step of transforming the first vapor into a second condensed mass containing the volatile component(s) in a second processing zone, at least a large fraction of each component in the second condensed mass being in a solid state.

3. A process of claim 2, which comprises a fourth step of bringing a second vapor containing the volatile component(s) and being at a second pressure that is higher than the said first pressure in contact with the second condensed mass to thereby condense the second vapor and melt the second condensed mass to thereby form a third condensed mass, at least a major fraction of which is in the liquid state, and a fifth step of discharging the third condensed mass from the second processing zone.

4. A process of claim 3, wherein portions of the mother liquors recovered from at least two crystallization sub-zones are mixed and become a recycled liquid, portions of the recycled liquid being introduced into at least two of the crystallization sub-zones.

5. A process of either one of claims 1 through 3, wherein there is only one crystallization sub-zone in the crystallization zone, denoted as the first processing zone, and the first condensed mass contains crystals of the m crystallizing components and a mother liquor.

6. A process of claim 5, which further comprises a sixth step of separating the first condensed mass into two or more separated condensed masses, each containing crystals of selected crystallizing components in an enriched state.

7. A process of claim 6, wherein each separated condensed mass contains mostly a mass of crystals of one crystallizing component and a mother liquor.

8. A process of either one of claims 1 through 3, wherein there are at least two crystallization sub-zones and portions of the feed mixtures are introduced into at least two of the crystallization sub-zones.

9. A process of either one of claims 1 through 3, wherein there are at least two crystallization sub-zones and the first condensed mass discharged from a crystallization sub-zone contains a mass of crystals of a selected group, that is a part of the crystallizing components, and a mother liquor and at least a part of the mother liquor produced in a crystallization sub-zone, say the i-th sub-zone, is introduced into another crystallization sub-zone, say the j-th sub-zone, to be processed in the j-th sub-zone.

* * * * *